(12) United States Patent
Kuehl et al.

(10) Patent No.: US 8,439,178 B2
(45) Date of Patent: May 14, 2013

(54) PROXIMITY SENSOR ENABLED MECHANICAL POWER COUPLING SYSTEM

(75) Inventors: Steven J. Kuehl, Stevensville, MI (US); Richard A. McCoy, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 696 days.

(21) Appl. No.: 12/643,174

(22) Filed: Dec. 21, 2009

(65) Prior Publication Data

US 2011/0147160 A1    Jun. 23, 2011

(51) Int. Cl.
F16D 23/00 (2006.01)

(52) U.S. Cl.
USPC .................... 192/66.1; 192/30 W

(58) Field of Classification Search .......... 192/30 W
See application file for complete search history.

(56) References Cited

U.S. PATENT DOCUMENTS

| | | | |
|---|---|---|---|
| 1,958,206 A | 5/1934 | Rubsam | |
| 3,101,984 A | 8/1963 | Wieckmann | |
| 3,258,553 A | 6/1966 | Breslin | |
| 3,710,060 A | 1/1973 | Brevick | |
| 4,068,179 A | 1/1978 | Sample et al. | |
| 4,148,536 A | 4/1979 | Petropoulsos et al. | |
| 4,317,969 A | 3/1982 | Riegler et al. | |
| 4,445,743 A | 5/1984 | Bakker | |
| 4,591,732 A | 5/1986 | Neuenschwander | |
| 4,604,505 A | 8/1986 | Henninger | |
| 4,663,542 A * | 5/1987 | Buck et al. ............ | 327/517 |
| 4,844,582 A | 7/1989 | Giannini | |
| 4,964,891 A | 10/1990 | Schaefer | |
| 5,031,258 A | 7/1991 | Shaw | |
| 5,207,148 A | 5/1993 | Anderson et al. | |
| 5,385,468 A | 1/1995 | Verderber | |
| 5,433,623 A | 7/1995 | Wakata et al. | |
| 5,713,752 A | 2/1998 | Leong et al. | |
| 5,828,341 A | 10/1998 | Delamater | |
| 6,176,718 B1 | 1/2001 | Skarie et al. | |
| 6,183,264 B1 | 2/2001 | Harsanyi | |
| 6,350,148 B1 | 2/2002 | Bartolutti et al. | |
| 6,359,270 B1 | 3/2002 | Bridson | |
| 6,428,334 B1 | 8/2002 | Skarie et al. | |
| 6,534,951 B2 | 3/2003 | Kawashima | |
| 6,559,882 B1 | 5/2003 | Kerchner | |
| 6,685,491 B2 | 2/2004 | Gergek | |

(Continued)

FOREIGN PATENT DOCUMENTS

| | | |
|---|---|---|
| EP | 0868077 A2 | 9/1998 |
| JP | 60033716 A | 2/1985 |

(Continued)

*Primary Examiner* — Richard M. Lorence
(74) *Attorney, Agent, or Firm* — Clifton G. Green; McGarry Bair PC

(57) ABSTRACT

Systems and components for providing or receiving a mechanical power service through a mechanical power coupling system. A mechanical power service switch is provided for selectively communicating the mechanical power service between a first mechanical power service communicating device, such as a host or other mechanical power service source and a first mechanical power service communicating device, such as a mechanical power service consumer. The mechanical power service switch is activated to transfer a mechanical power service in response to detection of a contactless proximity target associated with one of the mechanical power service communicating devices by a proximity sensor associated with the other of the mechanical power service communicating devices.

47 Claims, 7 Drawing Sheets

U.S. PATENT DOCUMENTS

| | | |
|---|---|---|
| 6,969,928 B2 | 11/2005 | Hanson |
| 6,981,695 B1 | 1/2006 | Hedlund et al. |
| 6,986,263 B2 | 1/2006 | Crisp, III |
| 7,024,717 B2 | 4/2006 | Hilscher et al. |
| 7,201,005 B2 | 4/2007 | Voglewede et al. |
| 7,207,080 B2 | 4/2007 | Hilscher et al. |
| 7,209,038 B1 | 4/2007 | Deconinck et al. |
| 7,264,026 B2 | 9/2007 | Gruber et al. |
| 7,291,032 B1 | 11/2007 | Carver et al. |
| 7,354,292 B1 | 4/2008 | Lloyd et al. |
| 7,404,298 B2 | 7/2008 | Kim et al. |
| 7,493,926 B2 | 2/2009 | Weglin |
| 7,584,030 B1 | 9/2009 | Graham |
| 7,618,295 B2 | 11/2009 | McCoy |
| 7,625,246 B2 | 12/2009 | McCoy et al. |
| 7,639,485 B2 | 12/2009 | McCoy |
| 7,651,368 B2 | 1/2010 | Kendall et al. |
| 7,686,127 B2 | 3/2010 | LeClear et al. |
| 7,713,090 B2 | 5/2010 | Kendall et al. |
| 7,740,505 B2 | 6/2010 | McCoy |
| 7,740,506 B2 | 6/2010 | McCoy |
| 7,748,494 B2 | 7/2010 | Leclear et al. |
| 7,751,184 B2 | 7/2010 | McCoy |
| 7,765,332 B2 | 7/2010 | McCoy et al. |
| 7,798,865 B2 | 9/2010 | McCoy et al. |
| 7,810,343 B2 | 10/2010 | McCoy et al. |
| 7,826,203 B2 | 11/2010 | McCoy |
| 7,841,907 B2 | 11/2010 | McCoy |
| 7,843,697 B2 | 11/2010 | McCoy et al. |
| 7,852,619 B2 | 12/2010 | McCoy |
| 7,865,639 B2 | 1/2011 | McCoy et al. |
| 7,869,201 B2 | 1/2011 | McCoy et al. |
| 7,870,753 B2 | 1/2011 | Marcy, V et al. |
| 7,871,300 B2 | 1/2011 | McCoy et al. |
| 7,898,812 B2 | 3/2011 | McCoy et al. |
| 7,903,397 B2 | 3/2011 | McCoy |
| 7,916,336 B2 | 3/2011 | Silverbrook et al. |
| 7,931,114 B2 | 4/2011 | LeClear et al. |
| 7,934,958 B2 | 5/2011 | Kendall et al. |
| 7,980,088 B2 | 7/2011 | LeClear et al. |
| 8,008,586 B2 | 8/2011 | Kuehl et al. |
| 8,035,958 B2 | 10/2011 | Kendall et al. |
| 8,040,666 B2 | 10/2011 | McCoy et al. |
| 8,151,016 B2 | 4/2012 | McCoy |
| 2002/0022991 A1 | 2/2002 | Sharood et al. |
| 2003/0037447 A1 | 2/2003 | Gruber et al. |
| 2003/0154338 A1 | 8/2003 | Boz et al. |
| 2004/0036273 A1 | 2/2004 | McClary |
| 2004/0154318 A1 | 8/2004 | Roh et al. |
| 2005/0011205 A1 | 1/2005 | Holmes et al. |
| 2006/0053655 A1 | 3/2006 | Weglin |
| 2006/0118694 A1 | 6/2006 | Lee et al. |
| 2006/0125360 A1 | 6/2006 | Kim et al. |
| 2006/0168236 A1 | 7/2006 | Higuma et al. |
| 2006/0187080 A1 | 8/2006 | Slatter |
| 2007/0086151 A1 | 4/2007 | Oh et al. |
| 2008/0065289 A1 | 3/2008 | Bertosa et al. |
| 2008/0125911 A1 | 5/2008 | Ebrom et al. |
| 2008/0164224 A1 | 7/2008 | McCoy et al. |
| 2008/0164225 A1 | 7/2008 | McCoy |
| 2008/0164226 A1 | 7/2008 | McCoy et al. |
| 2008/0164227 A1 | 7/2008 | LeClear et al. |
| 2008/0164796 A1 | 7/2008 | McCoy et al. |
| 2008/0165282 A1 | 7/2008 | Marcy et al. |
| 2008/0165474 A1 | 7/2008 | McCoy et al. |
| 2008/0165475 A1 | 7/2008 | McCoy et al. |
| 2008/0165476 A1 | 7/2008 | McCoy et al. |
| 2008/0165478 A1 | 7/2008 | McCoy |
| 2008/0165505 A1 | 7/2008 | McCoy et al. |
| 2008/0165509 A1 | 7/2008 | Kendall et al. |
| 2008/0165998 A1 | 7/2008 | LeClear et al. |
| 2008/0166895 A1 | 7/2008 | McCoy et al. |
| 2008/0166915 A1 | 7/2008 | Kendall et al. |
| 2008/0168205 A1 | 7/2008 | McCoy et al. |
| 2008/0192411 A1 | 8/2008 | McCoy |
| 2008/0201032 A1 | 8/2008 | Fayyad et al. |
| 2008/0222327 A1 | 9/2008 | McCoy et al. |
| 2008/0231464 A1 | 9/2008 | Lewis et al. |
| 2008/0231764 A1 | 9/2008 | Kendall et al. |
| 2008/0232053 A1 | 9/2008 | Kendall et al. |
| 2008/0247141 A1 | 10/2008 | Kendall et al. |
| 2008/0287009 A1 | 11/2008 | McCoy |
| 2009/0009316 A1 | 1/2009 | Kendall et al. |
| 2009/0047824 A1 | 2/2009 | Seibert et al. |
| 2009/0054804 A1 | 2/2009 | Gharib et al. |
| 2009/0161579 A1 | 6/2009 | Saaranen et al. |
| 2010/0120284 A1 | 5/2010 | Oka et al. |
| 2010/0182753 A1 | 7/2010 | Kendall et al. |
| 2010/0248546 A1 | 9/2010 | McCoy |
| 2011/0049308 A1 | 3/2011 | Beaman et al. |
| 2011/0146328 A1 | 6/2011 | Hendrickson et al. |
| 2011/0146329 A1 | 6/2011 | Kuehl et al. |
| 2011/0146330 A1 | 6/2011 | Kuehl et al. |
| 2011/0146819 A1 | 6/2011 | Hendrickson et al. |
| 2011/0147159 A1 | 6/2011 | Kuehl et al. |
| 2011/0147160 A1 | 6/2011 | Kuehl et al. |
| 2011/0147161 A1 | 6/2011 | Kuehl et al. |
| 2011/0147417 A1 | 6/2011 | Kuehl |
| 2011/0148216 A1 | 6/2011 | McCoy |
| 2011/0148223 A1 | 6/2011 | McCoy |
| 2011/0148649 A1 | 6/2011 | de Cavalcanti et al. |
| 2011/0148650 A1 | 6/2011 | Jenkins et al. |
| 2011/0148651 A1 | 6/2011 | Hendrickson et al. |
| 2011/0149485 A1 | 6/2011 | Kuehl et al. |
| 2011/0152024 A1 | 6/2011 | Kuehl |
| 2011/0153739 A1 | 6/2011 | McCoy |
| 2011/0153821 A1 | 6/2011 | McCoy |
| 2011/0153871 A1 | 6/2011 | Ferragut, II et al. |
| 2011/0153880 A1 | 6/2011 | McCoy |

FOREIGN PATENT DOCUMENTS

| | | |
|---|---|---|
| JP | 06310202 A | 11/1994 |
| JP | 06310204 A | 11/1994 |
| JP | 06333633 A | 12/1994 |
| JP | 2007080584 A | 3/2007 |
| WO | 2007/015274 A1 | 2/2007 |

* cited by examiner

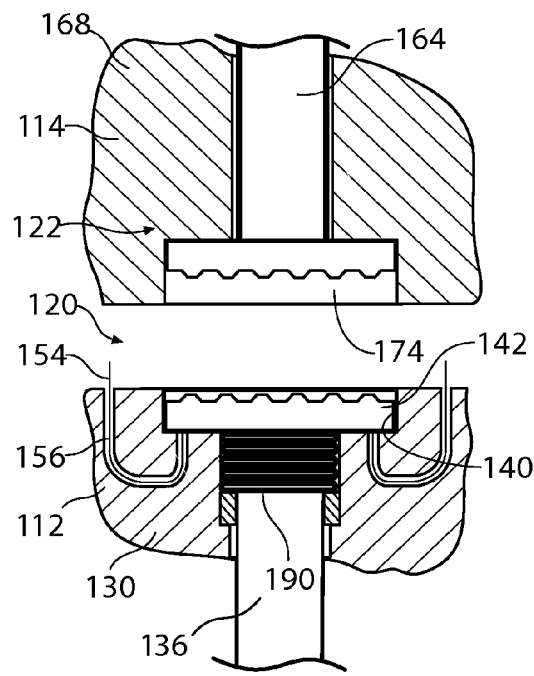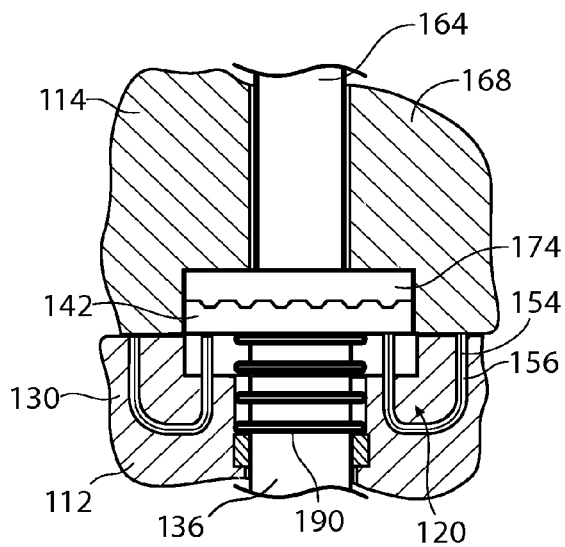
Figure 10
Figure 11
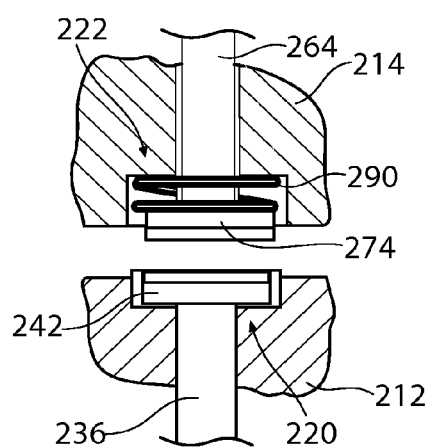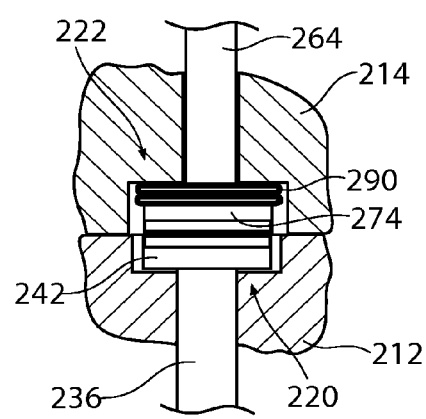
Figure 12
Figure 13

PROXIMITY SENSOR ENABLED MECHANICAL POWER COUPLING SYSTEM

BACKGROUND

Appliances and other useful household equipment are increasingly designed to interact with one another, as well as with a variety of consumer accessory devices. A consumer accessory device may be used, for example, in conjunction with an appliance to enhance or supplement the functionality of the appliance.

BRIEF SUMMARY

The invention relates to mechanical power couplings for selectively transferring a mechanical power service between mechanical power coupling components, for example in connecting an accessory device to a host.

According to one aspect of the invention, a mechanical power coupling system comprises a first mechanical power connector component capable of being associated with a mechanical power service consumer, a contactless proximity target associated with at least one of the first mechanical power connector component and the mechanical power service consumer, a second mechanical power connector component operably engageable with the first mechanical power connector component, the second mechanical power connector component capable of being associated with a mechanical power service source, and a contactless proximity sensor associated with at least one of the second mechanical power connector and the mechanical power service source, a mechanical power service pathway between the first and second mechanical power connector components when the mechanical power service components are interengaged, the mechanical power service pathway capable of passing a mechanical power service between the first and second mechanical power connector components, and a service switch operably associated with the contactless proximity sensor to selectively permit the communication of the mechanical power service along the mechanical power service pathway when the contactless proximity sensor detects the contactless proximity target.

According to another aspect of the invention, a mechanical power coupling system connects a portable device having a contactless proximity target to a host and a mechanical power service source capable of supplying a mechanical power service. The mechanical power coupling system comprises a mechanical power connector component, a contactless proximity sensor capable of detecting the contactless proximity target, a mechanical power service pathway interconnecting the mechanical power service source and the mechanical power connector component, and a service switch selectively permitting the communication of the mechanical power service along the mechanical power service pathway in response to detection of a contactless proximity target by the contactless proximity sensor.

According to yet another aspect of the invention, an accessory has a mechanical power service consumer for use in association with a host having a mechanical power service provider, a first mechanical power connector component, and a mechanical power service pathway selectively providing a mechanical power service to the first mechanical power connector in response to a contactless proximity sensor detecting a contactless proximity target. The accessory comprises a second mechanical power connector component, a mechanical power service pathway for interconnecting the mechanical power service consumer and the mechanical power connector, and a contactless proximity target capable of activating the contactless proximity sensor to activate the service switch.

According to still another aspect of the invention, an adapter removably couples a portable device having a first device mechanical power connector component to a host having a mechanical power service provider, a first host mechanical power connector component, a first mechanical power service pathway selectively providing a mechanical power service to the first mechanical power connector, and a service switch selectively activated in response to a contactless proximity sensor detecting a contactless proximity target to permit the mechanical power service pathway to provide the mechanical power service the first mechanical power connector. The adapter comprises a second host mechanical power connector component engageable with the first host mechanical power connector component, a second device mechanical power connector component engageable with the first device mechanical power connector component, a second mechanical power service pathway interconnecting the second host mechanical power connector component and the second device mechanical power connector component for the transfer of a mechanical power service there along, and a contactless proximity target capable of activating the contactless proximity sensor to activate the service switch.

According to still another aspect of the invention, a second mechanical power service communicating device communicates with a first mechanical power service communicating device having a first mechanical power service connector component, and a first contactless proximity system component. The second mechanical power service communicating device comprises a second mechanical power connector component capable of coupling with the first mechanical power service connector component for communication of mechanical power service therebetween, and a second contactless proximity system component associated with the mechanical power connector component and capable of engaging the first contactless proximity system component within a contactless proximity system to selectively regulate the communication of mechanical power service between the first and second mechanical power connector components in response to the interaction of the first and second contactless proximity system components.

BRIEF DESCRIPTION OF THE DRAWINGS

In the drawings:

FIGS. 10 and 11 are enlarged cross-sectional views illustrating a modular system according to a third embodiment of the invention employing an alternative mechanical power coupling system in a disengaged condition and an engaged condition, respectively.

FIGS. 12 and 13 are enlarged cross-sectional views illustrating a modular system according to a fourth embodiment of the invention employing another alternative mechanical power coupling system in a disengaged condition and an engaged condition, respectively.

DETAILED DESCRIPTION

Figure 1:
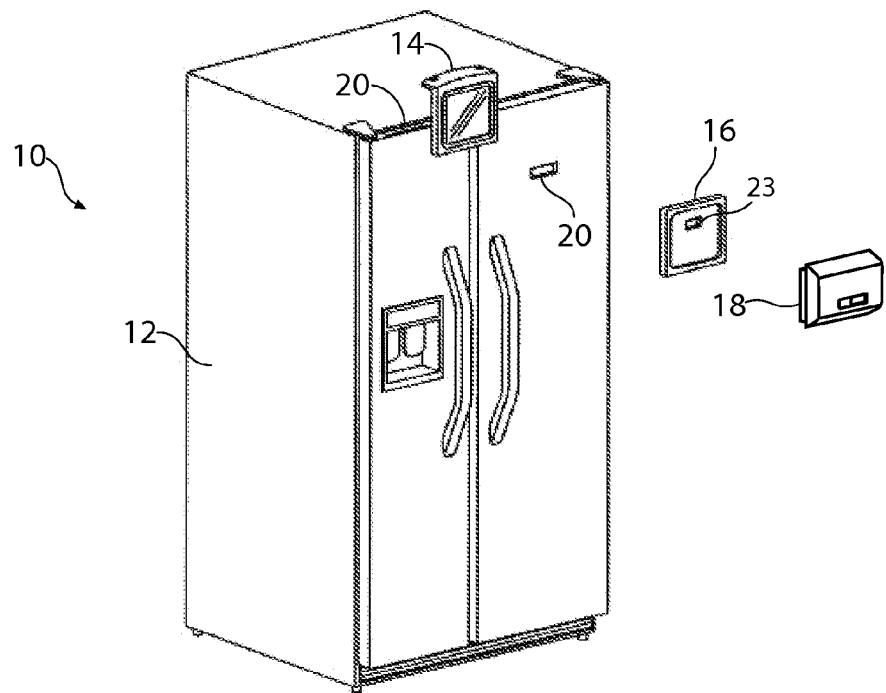
FIG. 1 is a perspective view of a modular system according to one embodiment of the invention employing a proximity sensor enabled mechanical power coupling system for connecting an accessory device to a host.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or to otherwise limit or restrict the claims to the precise forms and configurations shown in the drawings and disclosed in the following detailed description.

The drawings and the following detailed description relate generally to systems of mechanical power coupling systems for coupling a mechanical power service provider with a mechanical power service consumer. The following definitions apply to terms that may be used in the specification and the claims, unless otherwise noted.

As used herein, a "mechanical power service" is mechanical power or mechanical movement that may be communicated from one device to another.

As used herein, "mechanical power communication" or a "mechanical power service" is a useful provision of a mechanical power service from one device to another device. Communicating a mechanical power service means supplying or receiving a mechanical power service. As used herein, communication of mechanical power service includes both uni-directional and multi-directional communication, between any two devices, either directly, or through an adapter, as defined herein. It may be communicated through interengaging gears, wheels or plates, levers, and chains, for example.

The terms "provide" and "supply" as used herein, and any variation thereof, are used herein to denote a source of the mechanical power service relative to a device receiving the mechanical power service. Neither term is not limited to the original source of the mechanical power service. A device that provides or supplies the mechanical power service may simply be passing on the mechanical power service from the original source. For example, a device that provides power from a rotating wheel or gear may pass on to another device power in the form of a translating belt.

The term "receive" and any variation thereof, is used herein to denote receipt of the mechanical power service relative to the device providing the mechanical power service. The term is not limited to the ultimate consumer of the mechanical power service. A device that receives the mechanical power service may simply be passing on the mechanical power service from the source, such as transmission, to a device that will consume, as hereinafter defined, the mechanical power service. The device which receives a mechanical power service is not necessarily the end consumer of the mechanical power service.

The term "consume" and any variation thereof, as used herein, denotes the act of employing at least a portion of the mechanical power service received in connection with performing a function.

The term "coupled" and any variation thereof, as used herein, includes any type of connection that permits transfer of a mechanical power service between two devices. The term "coupled" includes both fixed and removable coupling as well as both continuous and intermittent coupling.

The term "useful device" and any variation thereof, as used herein, is a device that is capable of performing a useful physical or virtual function either alone or in combination with another device.

A "service connector system" as used herein is a connector system having at least two separate service connector components, each associated with a useful device. The service connector components cooperate with one another to couple the useful devices to facilitate communication of a service between the useful devices. A service connector system may carry multiple services. An electromagnetic service connector system, for example, may be associated with or incorporated into a mechanical power service connector system or may be independent of a mechanical power service connector system but be associated with the same mechanical power service provider or mechanical power service consumer.

The term "mechanical power service consumer" and any variation thereof, as used herein, is any useful device that employs, uses, stores, or dispenses a mechanical power service in connection with performing a physical or virtual function. A mechanical power service consumer may be, for example, a smart utensil, an appliance, a resource controller, a dispenser, a detergent dispenser, a drink dispenser, a mixer, a fan, a blender, or a cycle accessory.

The term "mechanical power service provider" and any variation thereof, as used herein, is any device that is capable of providing or supplying a mechanical power service to another device.

A "mechanical power service communicating device" as used herein is any device that is capable of communicating a mechanical power service with another device, and may be a mechanical power service provider or mechanical power service consumer.

As used herein, the term "host" is an apparatus that has a primary function independent of providing a mechanical power service. A host may be a mechanical power service provider, a mechanical power service consumer, or both. For example, the host may be an appliance and the primary function can be performing a series of steps to conduct a useful cycle of operation. The appliance may be a conventional household appliance, such as a refrigerator performing a cooling cycle or an ice making cycle. Other examples of appliances that may be hosts include, but are not limited to, a freezer, a conventional oven, a microwave oven, a dishwashing machine, a stove, a range, an air conditioner, a dehumidifier, a clothes washing machine, a clothes dryer, a clothes refreshing machine, and a non-aqueous washing apparatus, or any combination thereof. Alternatively, the host may be a fixture such as a water softener, a water heater, a furnace, pool water treatment equipment, or an HVAC system. The host may be a small device such as a blender, a mixer, a trash compactor, a vacuum cleaner, or a robot. The host can alternatively comprise a structural feature of a building, such as a wall, a cabinet, or a door. The host may also provide other services, such as electrical power, electronic data, substance handling, illumination, heat, or sound.

As used herein, the terms "accessory" or "accessory device" refer to any useful device which may be coupled to a host and communicate a mechanical power service to or from the host. An accessory device may be used primarily in conjunction with a host to enhance or supplement the functionality of the host, and may have independent functionality and utility. An accessory device may be a mechanical power service provider, a mechanical power service consumer, or both. Examples of an accessory device include, but are not limited to, a paper product dispenser, a dry goods dispenser, a bottle opener, a liquid dispenser, and a pill dispenser.

As used herein, the term "portable device" is an accessory device that is designed to be moveable by a user during its useful life between a use location and a storage location or alternative use location.

As used herein, the term "independent device" is a useful device that provides a useful function without being connected to a mechanical power service provider. In some cases, the primary function of the independent device is different from the primary function of the host from which the independent device may receive a mechanical power service. The independent device may be an accessory device.

As used herein, the term "dependent device" is a useful device that provides a useful function only when connected to a mechanical power service provider. A dependent device may be a mechanical power service consumer. Examples of a dependent device that may be coupled to a host include, but are not limited to, a smart pan or pot, an icemaker, and a bulk detergent dispenser.

As used herein, the term "mechanical power coupling system" is a connector system having at least two separate mechanical power service communicating connector components, each associated with a useful device. The mechanical power service communicating connector components cooperate with one another to couple the useful devices to facilitate communication of a mechanical power service between the useful devices.

As used herein, the term "switched mechanical power coupling system" is a mechanical power coupling system having switching capability in at least one of the mechanical power service communicating connector components operable to selectively control the communication of a mechanical power service between the components of the mechanical power coupling system.

As used herein, the term "mechanical power service switch", and any variation thereof, is any component used to selectively regulate the communication of a mechanical power service between components of a mechanical power service coupling system, such as switches, motors, fans, and controllers for controlling such devices. A "service switch" may be associated with switching mechanical power service or another type of service or more than one type of service. For example, an electromagnetic service switch may be associated with, integrated with, or comprise a mechanical power service switch or may be independent of a mechanical power service switch.

"Wireless" refers to a type of communication in which power and/or data is transferred over a distance without the use of electrical conductors or wires. For example, electromagnetic waves, light waves, or acoustic waves can be used to carry power and/or data over a distance without using electrical conductors or wires.

A "proximity target" as used herein is any component or device that may be detected when positioned within a predetermined distance of an associated proximity sensor, defined below. A proximity target may be passive, such as a visual target or a magnetic target formed of magnetic or magnetic responsive material. Other examples of passive proximity targets may include a conductive component or surface capable of cooperating with a magnetic field, a current, or a voltage provided by a proximity sensor. A proximity target may alternatively be active or powered such as an electromagnet, a generator of a magnetic field, a current, a voltage or an acoustic wave. An active proximity target may alternatively provide a powered readable display or dispense a detectable chemical.

A "proximity sensor" as used herein is any component or device that may detect an associated proximity target when the proximity target is within a predetermined distance of the proximity sensor. A proximity sensor may detect, for example, a change in an electromagnetic field, an electromagnetic wave, an acoustic wave, a visual target a chemical component, an electrical signal, a change in voltage, a change in current, a change in frequency, a change in resistance, a change in inductance, a change in capacitance, a mechanical signal, a change in pressure, a displacement, a vibration, and the presence of a chemical. A proximity sensor may be active or passive, such as a magnetic sensor of magnetic or magnet responsive material, or may alternatively be active. Examples of active sensors include active magnetic sensors, light sensors, optical sensors, acoustic sensors, electromagnetic sensors, chemical sensors and thermal sensors. Examples of magnetic sensors include magnets and magnetic responsive components. Examples of optical sensors include infrared sensors, photoelectric sensors, fiber optic sensors, photo resistors, photovoltaic sensors, photo diodes and cameras. Examples of electromagnetic sensors include radio receivers, radar sensors, Hall Effect sensors, inductive sensors, capacitive sensors, variable reluctance sensors and eddy current sensors. Examples of acoustic sensors include ultrasonic sensors and microphones. A contact proximity sensor detects a proximity target by touching the proximity target. A contactless proximity sensor detects the proximity target through a wireless or contactless means. For example, magnetic flux can be used as the signaling mechanism between a contactless proximity sensor and a contactless proximity target.

As used herein, the term "proximity system" is a system that uses a "proximity switch" operated by a plurality of "proximity coupling components," each associated with a different parent device, for determining that the parent devices are in proximity with each other. Parent devices are usually paired, examples of which include a service provide and a service consumer, a host and an accessory device, and a host and an adapter. Proximity coupling components may include a proximity target associated with one parent device to actively or passively provide an indication of the presence of the one parent device and a proximity sensor associated with the other parent device, responsive to the presence of the proximity target to activate the proximity switch. The proximity switch may be used to provide a signal or message indicative of the proximity of two parent devices or may directly or indirectly regulate the communication of a service along a service pathway. The systems disclosed herein can employ contactless proximity systems, wherein the proximity target and proximity switch use contactless or wireless means to detect the proximity of the two parent devices.

As used herein, the term "plug" is a generally male mechanical power service connection component.

As used herein, the term "receptacle" is a generally female mechanical power service connection component.

As used herein, the term "mechanical power service pathway" refers to a pathway for transferring a mechanical power service from one location to another. The mechanical power service pathway may have any of a variety of configurations depending on the type of mechanical power service being transferred, including but not limited to a shaft, a cable, a chain, or a belt.

As used herein, the term "adapter" is an intermediate device that may be provided between a first and second useful device, such as between a host and an accessory, to facilitate the communication of mechanical power services between the first and second useful devices. An adapter may receive a mechanical power service from the first useful device and provide the mechanical power service or a modified version of the mechanical power service to the second useful device, for example, by modifying the rotational speed at which mechanical power is delivered or by changing rotational motion into translational motion, for example. In some applications, multiple adapters may be interposed between two useful devices. In other applications, three or more useful devices may be coupled to a single adapter, such as multiple accessories for a host. In some applications, the adapter may itself be a useful device providing a useful function not provided by the other useful device or devices coupled to it. An adapter may optionally include a transformative component that transforms a service from a service provider to a different service, which is supplied to a service consumer. This may be useful when the service from the service provider is not compatible with the service consumer. The transformative component can be configured to transform the service into a compatible form for the service consumer. Examples of transformative components are protocol converters, power transformers, or other devices that convert substance, energy, or data from a first form to a second form.

As used herein, the term "functional unit" is the combination of any adapter coupled to an accessory, which together provide a functionality that neither the adapter nor the accessory can alone provide. Any functional unit itself is also included within the meaning of the term "accessory device".

The term "consumable" and any variation thereof, as used herein, includes any substance that may be consumed by a host, an accessory device, or a user person, such as food, cosmetics, or medicine. The consumable may, for example, be a substance that is used up and must be replenished for subsequent cycles of operation. For a clothes washer, a consumable might be a detergent and/or a softener. For a clothes dryer, a consumable might be an anti-static cloth. For a cooking or refrigeration appliance, the consumable may actually be the article on which the appliance performs its cycle of operation, as in the case of food, later to be consumed by a person. More specific examples of the use of a consumable in appliances include dispensing additives for clothes washers, clothes dryers, or combination washer/dryer appliances. The additives may include, but are not limited to, normal detergents, gentle detergents, dark clothing detergents, cold water detergents, fabric softeners, chlorine bleaches, color-safe bleaches, and fabric enhancement chemistry. Non-limiting examples of fabric enhancers are additives to provide stain resistance, wrinkle resistance, water repellency, insect repellency, color fastness, fragrances, and anti-microbials. Another example of a consumable is the filters used by an appliance. Refrigerators, dryers, washers, and dishwashers are all known to use filters that are consumed in the sense that they wear out and must be replaced.

As used herein, the term "substance holder" is anything that holds or contains a substance, which may include, but is not limited to, a container, a dispenser, a cartridge, a dish, a bag, or a carton.

As used herein, the term "consumable holder" is any substance holder that holds or contains a consumable.

Figure 2:
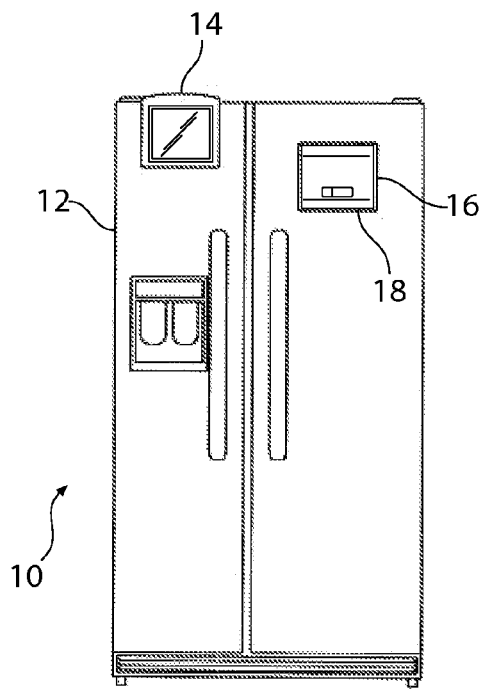
FIG. 2 is a front elevational view of the modular system of FIG. 1 showing the accessory device attached to the host.
Figure 3:
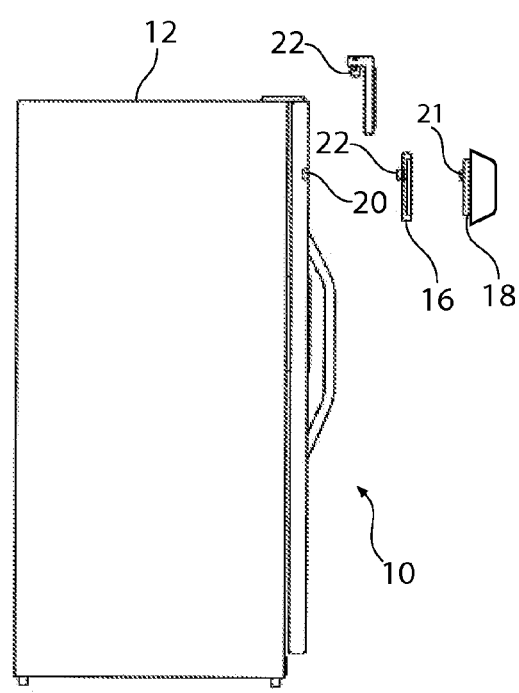
FIG. 3 is a side elevational view of the modular system of FIG. 1 showing the accessory device removed from the host.

Referring now to FIGS. 1-3, a schematic illustration of a modular system 10 according to one embodiment of the invention is shown to include at least one mechanical power service provider and at least one mechanical power service consumer. As illustrated herein, the mechanical power service provider is a host 12 and the mechanical power service consumer is at least one accessory device 14 that can be coupled to host 12.

The accessory device 14 maybe either directly or indirectly coupled to host 12. Direct coupling occurs when accessory device 14 includes a mechanical power service communicating connector component suitably configured for engaging a corresponding mechanical power service communicating connector component of host 12 to establish a mechanical power service pathway between the host 12 and the accessory device 14. The mechanical power service pathway provides a service pathway for transferring at least one mechanical power service from host 12 to accessory device 14 and from accessory device 14 to host 12.

The mechanical power service consumer may further include an adapter 16 provided for coupling a second accessory device 18 having an incompatible mechanical power service communicating connector component to host 12. A mechanical power service communicating connector component is incompatible if it cannot be directly coupled to a corresponding mechanical power service communicating connector component, such as when the incompatible mechanical power service communicating connector component lacks certain physical features that would enable the mechanical power service communicating connector component to engage the corresponding connector to establish a mechanical power service pathway. Adapter 16 may include a mechanical power service communicating connector component that can be directly coupled with the mechanical power service communicating connector component of host 12 and a second mechanical power service communicating connector component that can be directly coupled with the incompatible mechanical power service communicating connector component of accessory device 18, thereby establishing a mechanical power service pathway between host 12 and accessory device 18.

Although accessory device 14 is shown coupled to an upper surface of host 12, whereas accessory device 18 is shown attached to a front surface of host 12 by way of adapter 16, it shall be appreciated that in practice, accessory device 14 may be suitably configured for coupling to host 12 in any desired location and manner in order to accommodate the design and performance requirements of a particular application, such as on any surface on the exterior or interior an appliance.

Host 12 may perform a primary function. As illustrated herein, host 12 is a refrigerator performing a cooling cycle and/or an ice making cycle. Although the figures show an appliance comprising a refrigerator, it shall be understood that the invention is not limited to refrigerators or appliances in general.

Accessory device 14 and accessory device 18 may also perform at least one primary function. The primary functions of accessory device 14 and accessory device 18 will likely be different from the primary function performed by host 12, although it need not be.

Host 12 can be configured to communicate at least one mechanical power service to or from accessory device 14 and accessory device 18. Similarly, devices 14 and 18 may also be configured to communicate at least one mechanical power service to or from host 12. It is not necessary that the mechanical power service transferred between host 12 and devices 14 and 18 be used in performing the primary function of host 12 or accessory devices 14 and 18, or otherwise be related to the primary function of either accessory device.

As mentioned previously, in instances where the accessory device includes an incompatible mechanical power service communicating connector component that prevents direct coupling of the accessory device to host 12, adapter 16 may be provided for indirectly coupling the accessory device to host 12. Adapter 16 operates to establish a mechanical power service pathway for transferring the desired mechanical power service between host 12 and accessory device 18 having the incompatible mechanical power service communicating connector component.

At least one mechanical power service can be supplied to devices 14 and 18 from host 12, or from accessory devices 14 and 18 to host 12. The supply of the mechanical power service can be uni-directional in that either host 12 supplies the mechanical power service to accessory devices 14 and 18 or accessory devices 14 and 18 supply the mechanical power service to host 12. The supply of the mechanical power service can also be bi-directional in that the supplied mechanical power service can be delivered from host 12 to accessory devices 14 and 18 and from accessory devices 14 and 18 to host 12.

Exemplary mechanical power services that can be transferred between host 12 and accessory devices 14 and 18 may include any mechanical power or motion, such as rotary motion and translational motion. Host 12 may be operating as a service pathway for transferring a mechanical power service received from an outside source. It shall be appreciated that these are only examples of the various types of mechanical power services that can be transferred between host 12 and accessory devices 14 and 18.

In FIGS. 1-3, the accessory device 18 is a medicine module. The medicine module may provide convenient access and consumer visibility to a supply of medicine for a consumer, and allow the controlled dispensing or controlled access to the contents. Additionally, the medicine module may also provide control of temperature and humidity independently of the refrigerator or freezer compartments by the use of a fan or compressor system powered by the mechanical power service. It will be appreciated that the medicine module may be also include a suitable coupling for communicating cool air, a coolant, or a secondary coolant with host 12.

It will further be appreciated that, while the embodiments in the drawings illustrate specific types of mechanical power service communicating devices, such as a host 12 that may operate as a mechanical power service provider, an accessory device 14 that may operate as an mechanical power service consumer, and an adapter 16 that may act as a service pathway for the transfer of mechanical power service from host 12 to accessory device 18, variations from this configuration are possible. These variations include systems with only two mechanical power service communicating devices, systems with more than three mechanical power service communicating devices, systems where any of the devices may be mechanical power service consumers and/or mechanical power service providers, systems where multiple services, including, for example electrical power and data, are communicated, and systems where services are received by one device, converted in some manner, and then passed to a third device. Furthermore, in the following description, certain components of connector systems and proximity systems are described for the illustrative purposes as being associated with specific exemplary mechanical power service communicating devices. For example, a proximity switch, target or sensor may be described as being located in a mechanical power service provider, mechanical power service consumer, host or portable device. It will be appreciated that these system components may be alternatively assigned to the various mechanical power service communicating devices depending on the application.

Host 12 and accessory device 14 may each comprise at least one mechanical power service communicating connector component 20 and 22 respectively referred to herein as a host mechanical power service communicating connector component 20 and a device mechanical power service communicating connector component 22. Host mechanical power service communicating connector component 20 and device mechanical power service communicating connector component 22 have complementary configurations that enable the mechanical power service communicating connector components to be coupled to one another, thereby establishing a mechanical power service pathway over which desired mechanical power services can be transferred between host 12 and accessory device 14.

Host 12 also has a second host mechanical power service connector 20 provided on its front surface for a first mechanical power service connector 22 provided on the adapter 16. In instances where accessory device 18 includes an incompatible mechanical power service communicating connector component and an adapter 16 is used as an intermediate component to connect accessory device 18 to host 12, adapter 16 may include a second mechanical power service communicating connector 23 component for engagement with a device mechanical power service communicating connector component 21 of accessory device 18 in addition to the first mechanical power service communicating connector component 22 for connection with the host mechanical power service communicating connector component 20 of host 12. Therefore, both connector components 22 can have the same general configuration whether included as part of accessory device 14 or as a part of adapter 16. Similarly, both connector components 20 can have the same general configuration whether included as part of host 12 or as part of adapter 16. Accordingly, for purposes of discussion, the various features and operation of mechanical power service communicating connector component 22 will hereinafter be described in connection with accessory device 14, but it shall be appreciated that exemplary device mechanical power service communicating connector component 22 may also be used in conjunction with adapter 16.

Figure 4:
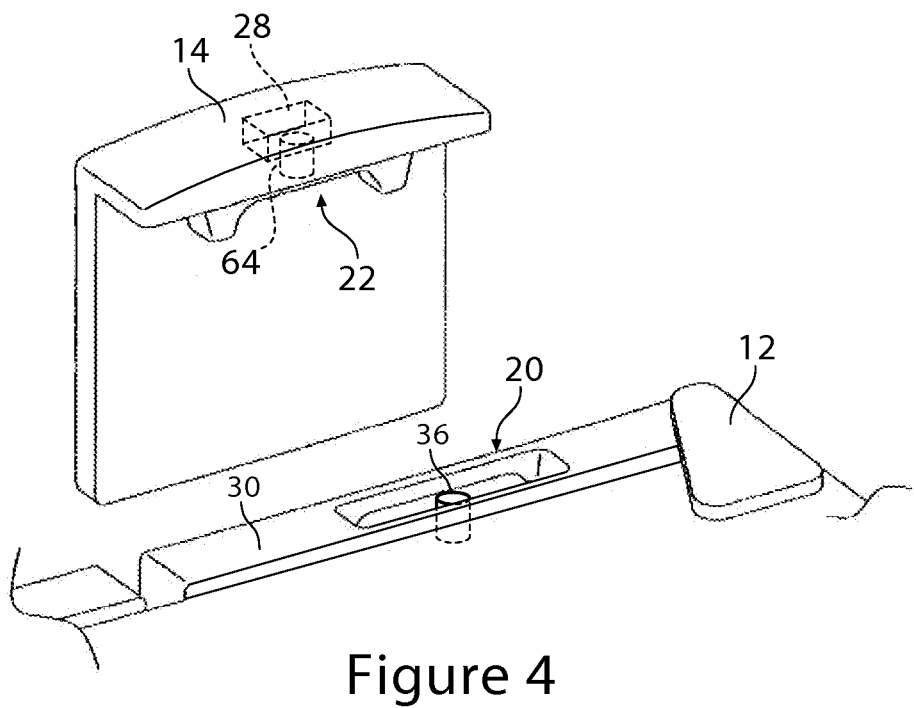
FIG. 4 is a partial top rear perspective view of the modular system of FIG. 1 with the accessory device removed from the host, showing a host portion of the proximity sensor enabled mechanical power coupling system.
Figure 5:
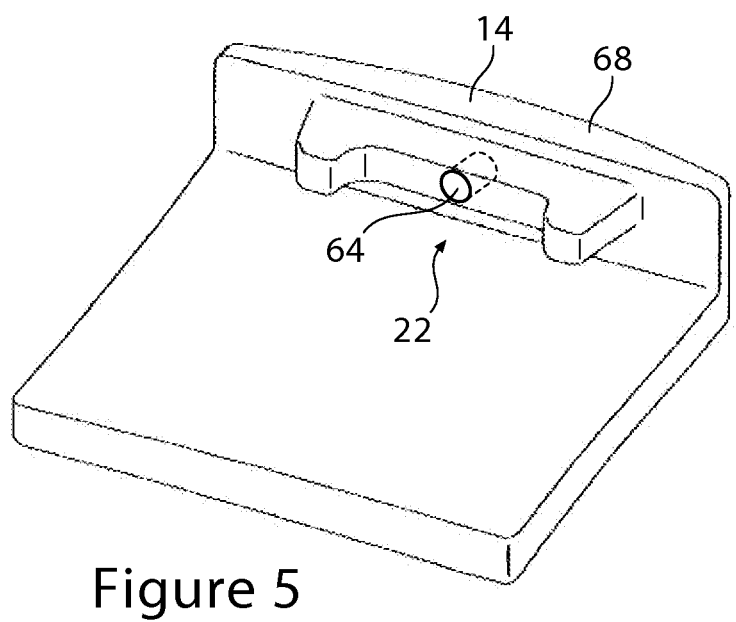
FIG. 5 is a bottom perspective view of the accessory device of FIG. 1 showing an accessory device portion of the proximity sensor enabled mechanical power coupling system.

Referring to FIGS. 4 and 5, host mechanical power service communicating connector component 20 can be integrally formed with host 12 or may be an add-on device. Host mechanical power service communicating connector component 20 may be enclosed within a housing 30 of the host 12. Housing 30 may be an integral part of host 12 or may be a separate component. For purposes of discussion, housing 30 is illustrated as an integral part of host 12, and more particularly as part of the door of a refrigerator. When configured as an add-on device, host mechanical power service communicating connector component 20 may also function as an adapter to enable a host and an accessory device having dissimilar mechanical power service communicating connector components to be indirectly coupled to one another. Host mechanical power service communicating connector component 20 may be removable or non-removable from host 12. Host mechanical power service communicating connector component 20 can be configured to transfer or receive a single mechanical power service or multiple mechanical power services.

Device mechanical power service communicating connector component 22 can be integrally formed with accessory device 14 or may be an add-on component. For purposes of discussion, device mechanical power service communicating connector component 22 is shown integrally formed with a housing 68 of accessory device 14. Housing 68 may be an integral part of accessory device 14 or may be a separate component. For purposes of discussion, housing 68 is illustrated as an integral part of accessory device 14. When configured as an add-on component, device mechanical power service communicating connector component 22 may also function as an adapter to enable a host and an accessory device having dissimilar mechanical power service communicating connector components to be indirectly coupled to one another. Device mechanical power service communicating connector component 22 may be removable or non-removable from accessory device 14. Device mechanical power service communicating connector component 22 can be configured to transfer or receive a single mechanical power service or multiple mechanical power services.

Figure 6:
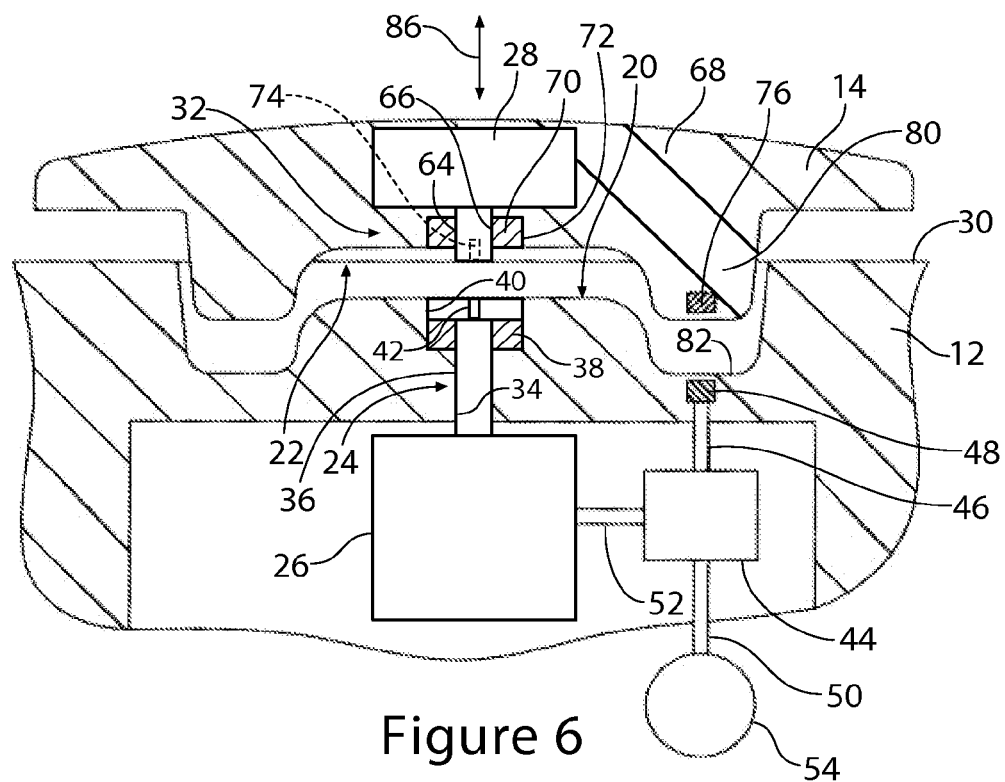
FIG. 6 is a partial cross-sectional view of the proximity sensor enabled mechanical power coupling system of FIG. 1 using a magnetic proximity target and a magnetic proximity sensor, shown with the accessory device portion of the mechanical power coupling system positioned for engagement with the host portion of the mechanical power coupling system.
Figure 7:
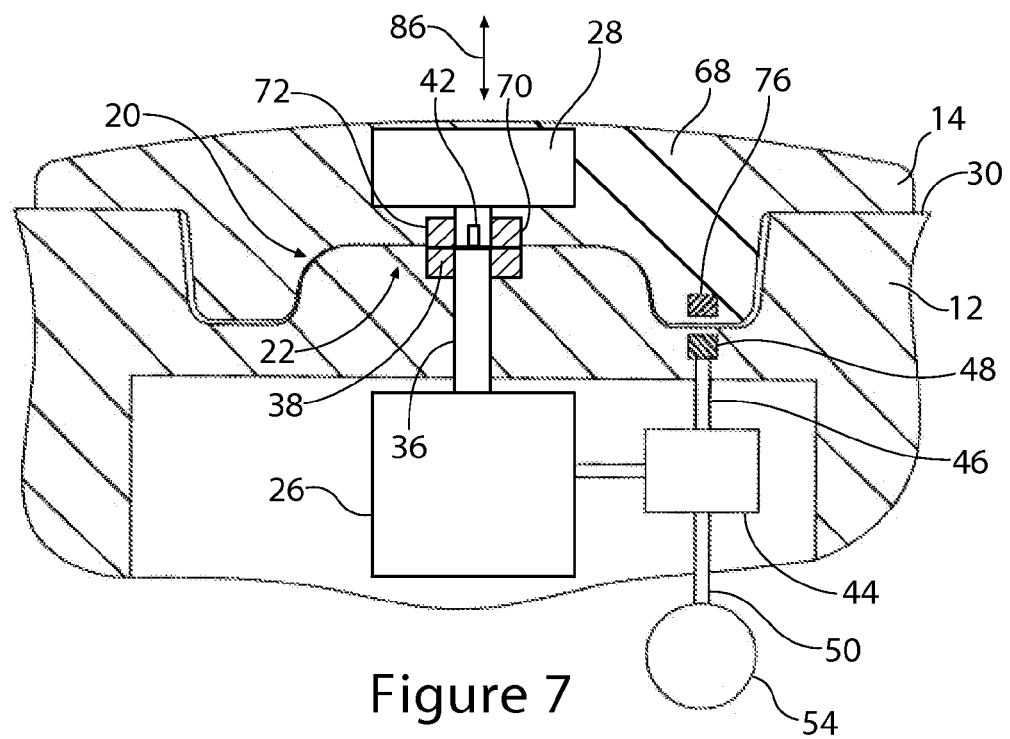
FIG. 7 is a partial cross-sectional view similar to FIG. 6 showing the accessory device portion of the mechanical power coupling system engaged with the host portion of the mechanical power coupling system.

Referring to FIGS. 6 and 7, host 12 may be associated with a mechanical power service provider 26 for selectively providing a mechanical power service via a mechanical power service pathway 24 to host mechanical power service communicating connector component 20 for delivery to device mechanical power service communicating connector component 22. Accessory device 14 may similarly be provided with a mechanical power service consumer 28 capable of receiving, via a mechanical power service pathway 32, and using the mechanical power service delivered to device mechanical power service communicating connector component 22.

It will be appreciated that, in addition to providing pathways and interfaces for mechanical power service, accessory device 14 and host 12 may be configured to provide additional service communication features, not shown, for communicating other services such as one or more electrical contacts connected by electrical wires to an electrical power consumer or provider. As further examples, they may have fiber optic interfaces, or complimentary substance communication couplings.

Host mechanical power service pathway 24 is operably connected to mechanical power service provider 26 and is operable for communicating a mechanical power service from mechanical power service provider 26 for delivery to accessory device 14. In the structure shown in FIGS. 6 and 7, mechanical power service provider 26 may be a motor disposed within the housing 30 of host 12 and providing rotational movement as an output. Host mechanical power service pathway 24 may be a shaft 36 having a distal end operably connected to the mechanical power service provider 26 and receiving rotational mechanical power therefrom. An intermediate portion of the shaft 36 extends through a passageway 34 in housing 30 and through a bearing 38 disposed in an enlarged bore 40 in the outer face of housing 30. The proximal end of shaft 36 is provided with a coupling feature, such as a male keyed end 42.

For purposes of discussion, mechanical power service pathways 24 and 32 are described and illustrated generically as rotating shafts. Alternative configurations may be used, such as translating belts, cables, or chains, with the choice depending on, at least in part, the type of mechanical power service required, the footprint of the devices involved, and manufacturing considerations.

Mechanical power service provider 26 is provided with a service switch 44, such as a contactless proximity service switch, responsive to the coupling of accessory device 14 to host 12 to regulate the delivery of mechanical power to host mechanical power service pathway 24. It should be understood that various proximity switches may be used to control mechanical power service communication through service pathway 24. The type of proximity switch may be designed to fail in a non-power communicating condition, such as a normally open switch.

Service switch 44 may be connected by a suitable service line 46 to a proximity sensor 48 responsive to a proximity target 76 associated with accessory device 14. Service switch 44 may also be connected by appropriate service lines 50 and 52 to an electrical power supply 54 and to mechanical power service provider 26, respectively.

In a simple application, service switch 44 operates as a power switch selectively delivering power from electrical power supply 54 to mechanical power service provider 26 in response to the detection by proximity sensor 48 of an appropriate proximity target 76. In an alternative application, mechanical power service provider 26 has a controller, not shown, regulating its output of mechanical power service to shaft 36, and service switch 44 operates as a signaling device providing the controller with a signal powered by electrical power supply 54 indicating that proximity sensor 48 has detected an appropriate proximity target.

As shown in FIG. 6, proximity sensor 48 may be embedded in housing 30 of host 12. Alternatively, proximity sensor 48 may be disposed with the housing 30. It will be appreciated the proximity sensor 48 may be any type of sensor able to wirelessly and contactlessly detect the presence of a proximity target and provide an output capable of being used by a service switch 44. For example, proximity target 76 may be a magnet and proximity sensor 48 may be a mechanical switch depressible by a magnet responding to the presence of a magnetic field generated by proximity target 76. For that application, service switch 44 may be integrated into proximity sensor 48.

Service switch 44 may have any of a variety of alternative configurations depending on the requirements of the particular application. Service switch 44 may be configured to selectively transfer an appropriate control signal for controlling mechanical power service provider 26 in response to a proximity sensor 48 detecting the presence of a proximity target associated with accessory device 14. The control signal may include, but is not limited to, an electrical signal, an acoustic or electromagnetic wave, a pneumatic signal, an optical signal, a magnetic flux signal, a radio frequency signal, an infrared (IR) signal, a hydraulic signal, or a physical displacement of a linking member. In such applications, service provider 26 may receive any signal source, such as a source of electrical power, pressurized air, water or other fluid, acoustical data, or other data source and line 52 may be any service pathway type appropriate for such signal source. In such applications, service switch 44 would substitute an appropriate switch type, such as a switch comprising a substance line if compressed fluid is used for carrying the signal.

Similarly, service line 46 may be an electrical line, a wireless electromagnetic link, a mechanical linkage, or pressurized fluid line, for example, depending on the design and output of proximity sensor 48.

As mentioned above, mechanical power service consumer 28 associated with accessory device 14 may be operably connected to an accessory device mechanical power service pathway 32. In the structure illustrated, mechanical power service consumer 28 is a device using or transferring rotational mechanical power. Device mechanical power service pathway 32 maybe a shaft 64 having a distal end connected to an input of mechanical power service consumer 28, an intermediate portion extending through a passageway 66 in housing 68 and a bearing 70 disposed in a large bore 72 in the outer face of housing 68. The proximal end of shaft 64 is provided with a coupling feature, such as a female keyed end 74 engageable with male keyed end 42 of shaft 36 associated with host 12 to selectively permit shaft 36 to engage with and drive shaft 64 when accessory device 14 is coupled to host 12.

Accessory device 14 may further be provided with a biasing member, not illustrated, for biasing shaft 64 into engagement with drive shaft 36 to accommodate any tolerance accumulation between components.

Accessory device 14 may further be provided with a proximity target 76 designed for cooperation with the proximity sensor 48.

Similar to host mechanical power service pathway 24, accessory device mechanical power service pathway 32 is also illustrated and described as a rotating shaft. There are a variety of potentially different configurations that may vary depending on the type of mechanical power service being transferred, as well as other design considerations. In practice, the actual configuration may vary depending on, at least in part, the type of mechanical power service being transferred, packaging requirements, and manufacturing considerations.

Host mechanical power service communicating connector component 20 and device mechanical power service communicating connector component 22 may include various features to facilitate coupling of accessory device 14 to host 12. For example, device mechanical power service communicating connector component 22 may include a raised boss 80 that can engage a corresponding recess 82 of host mechanical power service communicating connector component 20. Alignment features such as boss 80 and recess 82 may assist in positioning device mechanical power service communicating connector component 22 relative to host mechanical power service communicating connector component 20 prior to engagement, and may also function to minimizing lateral movement of accessory device 14 relative to host 12 when device mechanical power service communicating connector component 22 is coupled to host mechanical power service communicating connector component 20. It shall be appreciated, however, that the illustrated configuration is merely one example of the type of features that may be incorporated into host mechanical power service communicating connector component 20 and device mechanical power service communicating connector component 22 to aid alignment and coupling of accessory device 14 to host 12. In practice, other configurations may also be employed to accommodate various design considerations of a particular application.

The process of coupling and decoupling accessory device 14 with host 12 will now be described. Coupling of accessory device 14 to host 12 can be accomplished by positioning accessory device 14 adjacent host 12 in such a manner that device mechanical power service communicating connector component 22 is generally aligned with host mechanical power service communicating connector component 20, as shown in FIG. 6. Device mechanical power service communicating connector component 22 and host mechanical power service communicating connector component 20 can be coupled together by generally moving accessory device 14 toward host 12 along a path indicated by arrow 86 until the two members are fully seated, as shown in FIG. 7. With device mechanical power service communicating connector component 22 fully engaging host mechanical power service communicating connector component 20, keyed end 74 of shaft 64 operably engages keyed end 42 of shaft 36. The process of coupling device mechanical power service communicating connector component 22 to host mechanical power service communicating connector component 20 causes proximity target 76 to engage proximity sensor 48 to operate service switch 44, allowing power or a control signal to be transmitted to mechanical power service provider 26.

It should be noted that mechanical power service switch 44 is intended to selectively permit and inhibit communication of mechanical power service from the mechanical power service supply to the keyed end 42 of the shaft 36 based on the presence of the proximity target 76 and that other switches, sensors and controls may be provided to further regulate the control of mechanical power service based on the needs of the user of the accessory device 14.

Accessory device 14 may be decoupled from host 12 by reversing the previously described process for coupling the two devices together. Disengaging device mechanical power service communicating connector component 22 from host mechanical power service communicating connector component 20 deactivates service switch 44, interrupting the communication of electrical power or a control signal to mechanical power service provider 26.

Figure 8:
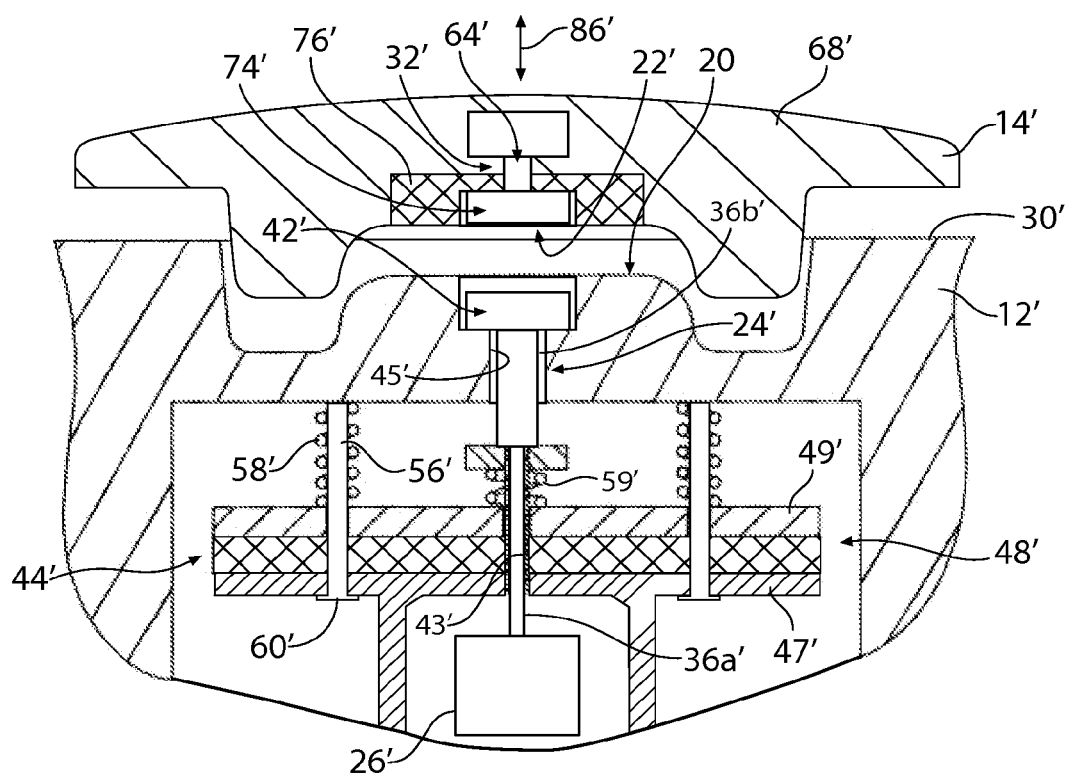
FIGS. 8 and 9 are partial cross-sectional views illustrating a modular system according to a second embodiment of the invention employing an alternative proximity sensor enabled mechanical power coupling system shown in a disengaged condition and an engaged condition, respectively.
Figure 9:
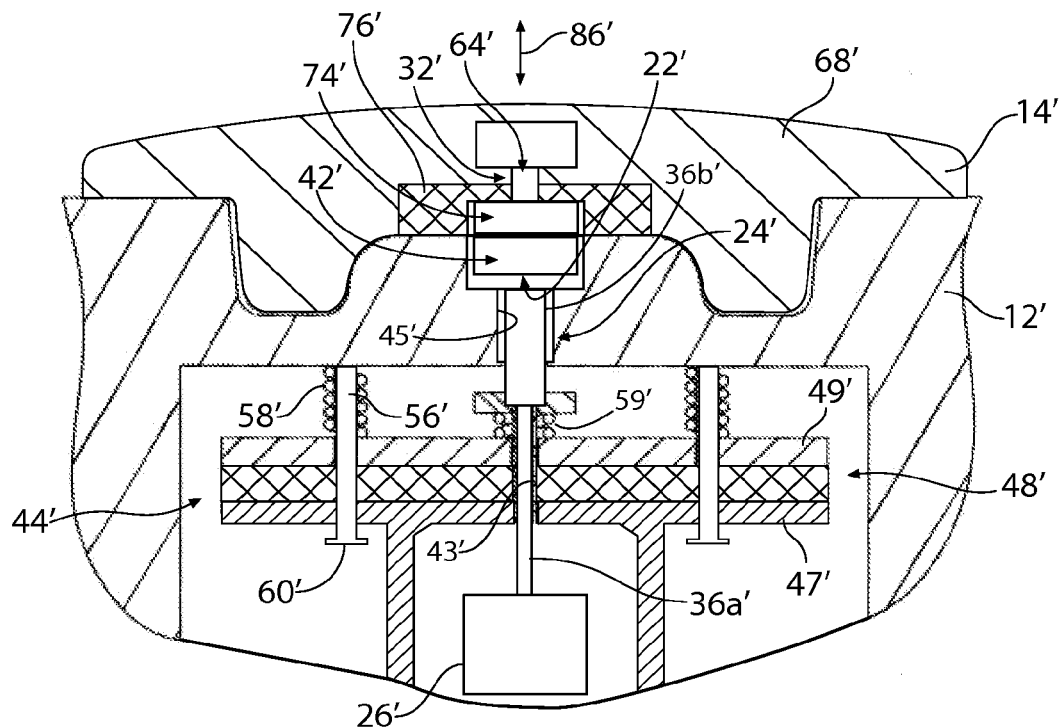

Referring now to FIGS. 8 and 9, a modular system according to a second embodiment of the invention is illustrated and employs an alternative proximity sensor enabled mechanical power coupling system, where elements in common with the first embodiment are denoted by the same reference numeral bearing a prime (') symbol. The exemplary structure shown differs from the structure described above with reference to FIG. 6 in that host 12' and accessory device 14' use clutch plates 42' and 74' in place of keyed ends 42 and 74 (see FIG. 6). Furthermore, host 12' uses a wireless proximity service switch using a proximity sensor 48' comprising a magnetic plate, described below, responsive to a proximity target 76' comprising another magnet associated with accessory device 14' to mechanically displace clutch plate 42' into engagement with clutch plate 74' in response to detection of a proximity target 76' by proximity sensor 48'.

More particularly, the service switch 44' may include a proximity sensor 48' comprising a magnetic plate 47' backed by a second plate 49' for strength and stability and movably mounted on two or more headed pins 56' to housing 30' of host 12'. Magnetic plate 47' may be a magnetized plate or may be made of a material responsive to a magnetic force. Plate 49' may be manufactured of steel, plastic composite or other suitable material. One or more biasing members, such as coil springs 58' disposed about the pins 56', may be provided to bias the plate 47' against the heads 60' of the pins 56' and away from the accessory device 14'.

Mechanical power service pathway 24' may include a first shaft 36a' extending from mechanical power service provider 26' through apertures 43', and 45', through the plates 47' and 49'. Mechanical power service pathway 24' may further include a second shaft 36b' coupled to service switch 44' and constrained to move with service switch 44'. Shafts 36a' and 36b' may be coupled together, such as through a keyed coupling, to permit shaft 36b' to be rotatably driven by shaft 36a' but to permit longitudinal displacement of shaft 36b' by service switch 44'. Clutch plate 42' is disposed on the distal end of shaft 36b'.

Clutch plate 42' may be biased slightly away from mechanical power service provider 26', for example by a spring 59', to provide some flexibility to accommodate tolerance buildup and vibration when clutch plate 42' engages clutch plate 74'.

Service switch 44' is movable between an open position shown in FIG. 8 and closed position shown in FIG. 9 to enable a mechanical power service to be selectively transferred between host 12' and accessory device 14' when accessory device 14' is coupled to host 12'. Mechanical power service switch 44' is generally disposed in the open position when accessory device 14' is decoupled from host 12'.

Accessory device 14' may be provided with a proximity target 76', such as a magnet. In the example illustrated, the proximity target 76' is an annular magnetic plate embedded in housing 68' of accessory device 14' and disposed about the shaft 64' of the device mechanical power service pathway 32'.

The process of coupling and decoupling accessory device 14' with host 12' will now be described. Coupling of accessory device 14' to host 12' may be accomplished by positioning accessory device 14' adjacent host 12' in such a manner that device mechanical power service communicating connector component 22' is generally aligned with host mechanical power service communicating connector component 20', as shown in FIG. 8. Device mechanical power service communicating connector component 22' and host mechanical power service communicating connector component 20' may be coupled by generally moving accessory device 14' toward host 12' along a path indicated by arrow 86' until the two members are fully seated, as shown in FIG. 9. When connector components 20' and 22' are interengaged, they are spatially disposed such that the attractive magnetic force between magnetic plate 47' and proximity target 76' overcomes the opposing force represented by springs 58', and moves service switch 44' away from mechanical power service provider 26', driving clutch plate 42' of shaft 36b' into engagement with clutch plate 74' of shaft 64'.

It should be noted that the placement of proximity sensor and proximity target relative to their spatial disposition to one another from their respective locations in the accessory device 14 and in the host 12, the proximity sensor's sensing sensitivity, and the proximity target's sensible signal may be designed such that the flow of mechanical power service is inhibited until the components are within a desired spatial disposition range.

Accessory device 14' may be decoupled from host 12' by reversing the previously described process for coupling the two devices. Separation of device mechanical power service communicating connector component 22' from host mechanical power service communicating connector component 20' moves proximity target 76' away from magnetic plate 47' and releases service switch 44', permitting the springs 58' to again disengage mechanical power service pathways 24' and 32'.

For purposes of discussion, mechanical power service pathways 24' and 32' are described and illustrated generically as rotating shafts. Alternative configurations may be used, such as translating belts, cables, or chains, with the choice depending on, at least in part, the type of mechanical power service required, the footprint of the devices involved, and manufacturing considerations. It will be appreciated that coupling components selected will vary depending upon the type of mechanical power service being transferred and the pressures involved.

Referring now to FIGS. 10 through 16, various modular systems according to other embodiments of the invention are illustrated and employ alternative coupling components. It will be appreciated that the coupling components will vary depending upon the type of mechanical power service being transferred and the pressures involved.

As illustrated schematically in FIGS. 10 and 11, for example, a modular system according to a third embodiment of the invention comprises a host 112 and an accessory device 114 that may transfer power between respective mechanical power service communicating connector components 120 and 122 comprising shafts having toothed clutch plates 142 and 174 formed on the respective proximate ends of shafts 136 and 164. Toothed clutch plates 142 and 174 function similarly to the keyed ends 42 and 74 of shafts 36 and 64, described above with reference to FIGS. 6 and 7, except that their large interengaged surface areas permit the toothed clutch plates to communicate more torque and accommodate more shock than the keyed ends.

A biasing member, such as a spring 190, may provided in or near an enlarged bore 140 in a housing 130 of host 112 to bias clutch plate 142 into engagement with clutch plate 174 to provide a reliable connection while accommodating tolerance accumulation and vibration. Alternatively, not shown, a biasing member may be provided for biasing clutch plate 174 into engagement with clutch place 142. One or more cables 154 extend from a touch point on the underside of toothed clutch plate 142, such as a bearing surface, through one or more U-shaped channels 156 in housing 130, and extend outward from housing 130 such as to be engageable by a housing 168 of accessory device 114. Housing 168 may engage cables 154 and thereby drive toothed clutch plate 142 into engagement with toothed clutch plate 174. This configuration may be used, for example, in conjunction with service switch 44 described with reference to FIGS. 6 and 7 above.

Alternatively, the toothed clutch plates 142 and 174 may be used without the cables 154 and merely substituted for the keyed ends 42 and 74 shown in FIGS. 6 and 7 or for the flat clutch plates 42' and 74' shown in FIGS. 8 and 9.

As illustrated schematically in FIGS. 12 and 13, a modular system according to a fourth embodiment of the invention comprises a host 212 and an accessory device 214 that may transfer power between respective mechanical power service communicating connector components 220 and 222 comprising respective shafts 236 and 264. The shafts 236 and 264 have respective flat clutch plates 242 and 274 formed on the proximate ends of shafts 236 and 264. Flat clutch plates 242 and 274 function similarly to the toothed clutch plates 142 and 174, described above with reference to FIGS. 10 and 11, except that they use rough surfaces rather than teeth for interengagement. The rough surface permits some slippage between the plates, which may be desirable for some applications. Furthermore, they are not as sensitive to initial alignment of the plates as are the toothed clutch plates 142 and 174, described above. A biasing member, such as a spring 290, may be provided to bias one of the flat clutch plates 242 and 274 into engagement with the other flat clutch plates to provide a reliable connection while accommodating tolerance accumulation and vibration.

Figure 14:
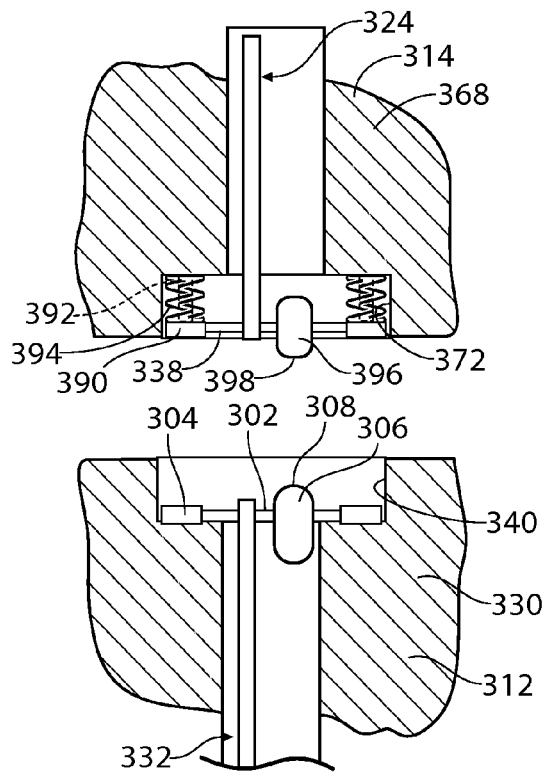
FIGS. 14 and 15 are enlarged cross-sectional views illustrating a modular system according to a fifth embodiment of the invention employing yet another alternative mechanical power coupling system in a disengaged condition and an engaged condition, respectively.
Figure 15:
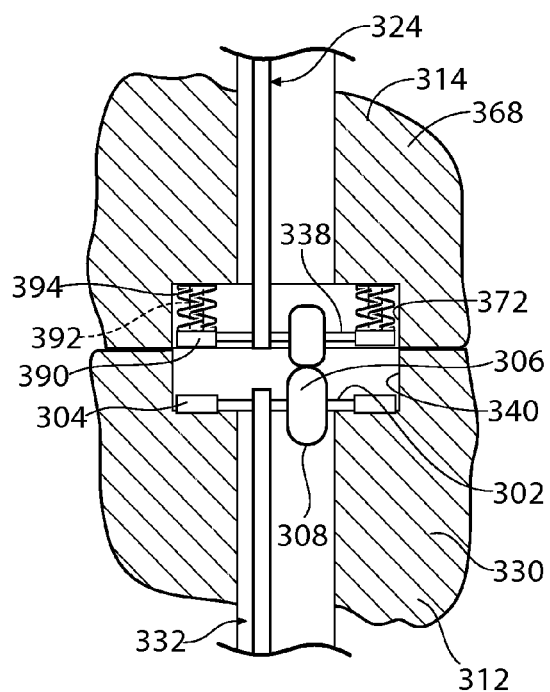
Figure 16:
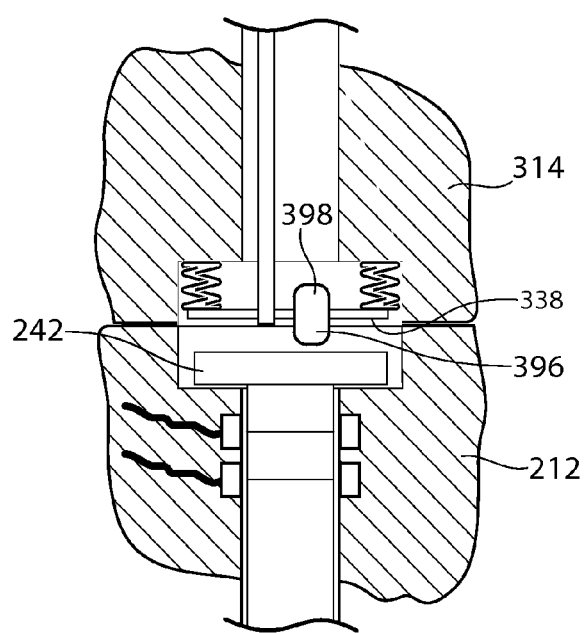
FIG. 16 is an enlarged cross-sectional view illustrating a modular system according to a sixth embodiment of the invention employing another alternative mechanical power coupling system in an engaged condition, respectively.

As mentioned above, it is contemplated that mechanical power may be communicated using means other than rotating shafts. FIGS. 14 through 16 illustrate modular systems where power is at least partially communicated using a translating belt.

As illustrated schematically in FIGS. 14 and 15, a modular system according to a fifth embodiment of the invention comprises a host 312 that may communicate mechanical power from a mechanical power source, not shown, by way of a mechanical service pathway 332 comprising a translating belt having a portion extended about a shaft 302 disposed in a bore 340 in a housing 330 of the host 312. The belt may have a grooved surface, not shown, engaging a similarly grooved surface on the exterior of the shaft. It will be apparent that, as desired for certain applications, a cable and pulley or a chain and gear system may be substituted for the belt and grooved surface system described. Shaft 302 is rotatably mounted at each end to housing 330 of host 312, such as by supports 304 mounted to the base of bore 340. A wheel 306 having a circumferentially disposed engagement surface 308, such as a frictional surface or gear teeth, is fixedly secured to shaft 302 for rotation therewith.

An accessory device 314 may similarly communicate mechanical power to a mechanical power consumer, not shown, by way of a mechanical service pathway 324 comprising a translating belt having a portion extended about a shaft 338 disposed in a bore 372 in a housing 368 of accessory device 314. Shaft 338 is rotatably mounted at each end to housing 368 of accessory device 314, such as by supports 390, which are, in turn, slidably supported on a pin 392, mounted to the base of bore 372. A biasing member, such as a spring 394, may surround each pin 392 and bias shaft 338 away from the base of bore 372 against a stop, not shown, provided on pins 392 to limit the movement of the shaft 338. A wheel 396 having a circumferentially disposed engagement surface 398, such as a frictional surface or gear teeth, is fixedly secured to shaft 338 for rotation therewith.

When accessory device 314 is coupled with host 312, as shown in FIG. 15, the respective engagement surfaces 308 and 398 of wheels 306 and 396 engage to permit the communication of power therebetween. Springs 394 maintain a reliable coupling between wheels 306 and 396 and accommodate a tolerance accumulation and vibration between accessory device 314 and host 312.

As mentioned above, it is contemplated that mechanical power may be communicated between devices using dissimilar types of mechanical power. In some cases, power may be transmitted using one type of power and then converted, such as by an adapter, to a different type of mechanical power. It is also contemplated that some conversion may occur at the coupling between a host and an accessory device.

As illustrated schematically in FIG. 16, a modular system according to a sixth embodiment of the invention comprises one component using a rotating shaft and another component using a translating belt. For example, the modular system can have the host 212 of FIGS. 10 and 11 and the accessory device 314 of FIGS. 14 and 15, with engagement surface 398 of wheel 396 engaging the flat clutch plate 242 to communicate power therebetween.

It will be appreciated that still further variations are possible. For example, flat clutch plate 242 may be replaced with a beveled gear, and wheel 396 may have a complementary beveled gear. Alternatively, wheel 396 may be keyed to shaft 338 and be selectively displaceable along shaft 338 to provide a variable transmission between the components at the coupling.

Figure 17:
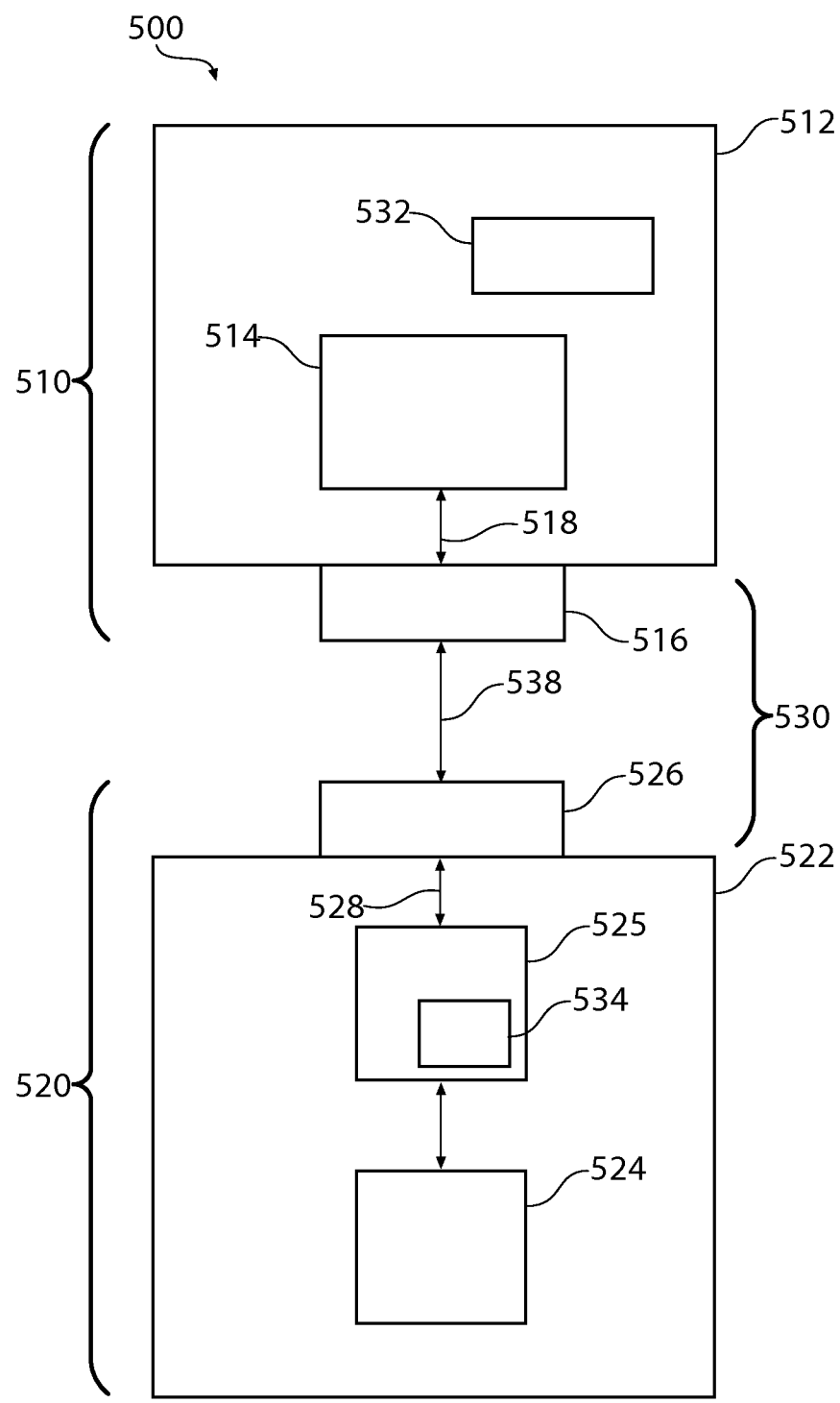
FIG. 17 is a generalized schematic illustration of a mechanical power service source, a mechanical power coupling system, and a removably coupled mechanical power service consumer.

Referring now to FIG. 17, a more general example of a mechanical power service provider and consumption system 500 is schematically illustrated. A first subsystem 510 is connectable to a second subsystem 520 for selectively transferring a mechanical power service between the subsystems 510 and 520. As illustrated, first subsystem 510 may include an accessory device 512 having a mechanical power service consumer 514 connected to a connector component, such as a plug 516, by a mechanical power service pathway 518. Second subsystem 520 may include a host 522, such as a refrigerator, including a mechanical power service provider 524 connected to a connector component, such as a receptacle 526, through a mechanical power service switch 525 by mechanical power service pathway 528.

A coupling system 530 includes plug 516 and receptacle 526 which are selectively interengageable. A proximity target 532 and a proximity sensor 534 are respectively associated with first subsystem 510 and second subsystem 520 to selectively activate the mechanical power service switch 525 when the plug 516 and receptacle 526 are engaged to permit the communication of the mechanical power service from the mechanical power service provider 524 to the receptacle 526, so that it may subsequently be provided along a mechanical power service pathway 538 between receptacle 526 and plug 516, and then along mechanical power service pathway 518 to mechanical power service consumer 514.

It will be appreciated that while host 522 is illustrated as including a mechanical power service provider and accessory device 512 is illustrated as including a mechanical power service consumer, accessory device 512 may alternatively or additionally include a mechanical power service provider and host 522 may alternatively or additionally include a mechanical power service consumer. It will further be appreciated that while plug 516 is illustrated as being associated with mechanical power service consumer 514 and receptacle 526 is illustrated as being associated with mechanical power service provider 524, it is contemplated that plug 516 and receptacle 526 may be male or female coupling system components so long as the components are capable of interengaging to permit the transfer of mechanical power service there between.

In principle then, a consumer may be provided with a plurality of interchangeable modular accessory devices, each adapted to mount to a host. Accessory devices can be retro-fit into the host, after initial installation of the host in a home, or may be used for modular assembly at a factory or at the time of delivery and installation.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In summary, it should be understood that the invention is capable of modification and variation and is limited only by the following claims.

All defined terms used in the claims are intended to be given their broadest reasonable constructions consistent with the definitions provided herein. All undefined terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A mechanical power coupling system comprising:
a first mechanical power connector component capable of being associated with a mechanical power service consumer;
a contactless proximity target associated with at least one of the first mechanical power connector component and the mechanical power service consumer;
a second mechanical power connector component operably engageable with the first mechanical power connector component, the second mechanical power connector component capable of being associated with a mechanical power service source;
a contactless proximity sensor associated with at least one of the second mechanical power connector and the mechanical power service source;
a mechanical power service pathway between the first and second mechanical power connector components when the first and second mechanical power connector components are interengaged, the mechanical power service pathway capable of passing a mechanical power service between the first and second mechanical power connector components; and
a service switch operably associated with the contactless proximity sensor to selectively permit the communication of the mechanical power service along the mechanical power service pathway when the contactless proximity sensor detects the contactless proximity target;
wherein the contactless proximity target and the contactless proximity sensor are magnetic and the service switch responds to movement of the contactless proximity sensor in response to the detection of the contactless proximity target by the contactless proximity sensor.

2. The system according to claim 1, wherein one of the first and second mechanical power connector components comprises a mechanical power service plug and the other of the first and second mechanical power connector components comprises a mechanical power service receptacle.

3. The system according to claim 1, wherein the contactless proximity sensor is selected from a magnetic sensor, a light sensor, an optical sensor, an eddy current sensor, an acoustic sensor, an electromagnetic sensor, a chemical sensor, and a thermal sensor.

4. The system according to claim 1, wherein the service switch selectively enables the mechanical power service pathway in response to the detection of the contactless proximity target by the contactless proximity sensor.

5. The system according to claim 4, wherein the contactless proximity sensor is slidably disposed within the mechanical power service pathway.

6. The system according to claim 5, wherein the contactless proximity sensor is movable between a first position, in which the mechanical power service is substantially prevented from communicating through the mechanical power service pathway between the first and second mechanical power connector components, and a second position, in which the mechanical power service is allowed to pass through the mechanical power service pathway between the first and second mechanical power connector components.

7. The system according to claim 6, wherein the contactless proximity sensor is arranged in the first position when the contactless proximity sensor does not detect the contactless proximity target.

8. The system according to claim 6 and further comprising a biasing member connected to the contactless proximity sensor, the biasing member urging the contactless proximity sensor toward the first position.

9. The system according to claim 6, wherein the contactless proximity target and the contactless proximity sensor are magnetic and the service switch comprises the contactless proximity sensor, the contactless proximity sensor responding to the detection of the contactless proximity target by moving away from the first position toward the second position.

10. The system according to claim 1 and further comprising a host configured to communicate the mechanical power service to the mechanical power service consumer.

11. The system according to claim 10, wherein the host comprises at least one of a refrigerator, a freezer, a conventional oven, a microwave oven, a dishwashing machine, a stove, a range, an air conditioner, a dehumidifier, a clothes washing machine, a clothes dryer, a clothes refreshing machine, a non-aqueous washing apparatus, a water softener, a water heater, a furnace, pool water treatment equipment, an HVAC system, a thermostat, a blender, a mixer, a toaster, a coffee maker, an air purifier, an iron, a vacuum cleaner, a robot, a trash compactor and a structural feature of a building.

12. The system according to claim 11 and further comprising a portable accessory device comprising the mechanical power service consumer.

13. The system according to claim 1, wherein one of the mechanical power service source and the mechanical power service consumer comprises an appliance and the other of the mechanical power service source and the mechanical power service consumer comprises an appliance accessory.

14. The system according to claim 1, wherein the contactless proximity target is selected from a passive target and an active target.

15. The system according to claim 1, wherein the contactless proximity sensor is selected from a passive sensor and an active sensor.

16. The system according to claim 1 and further comprising the mechanical power service consumer coupled to the mechanical power service pathway.

17. The system according to claim 1 and further comprising a mechanical power service provider coupled to the mechanical power service pathway.

18. The system according to claim 1, wherein the second mechanical power connector component comprises at least one of a flat clutch plate, a toothed clutch plate, a wheel, a gear and a keyed coupling component.

19. A mechanical power coupling system for connecting a portable device having a contactless proximity target to a host and a mechanical power service source capable of supplying a mechanical power service, the mechanical power coupling system comprising:
- a mechanical power connector component;
- a contactless proximity sensor capable of detecting the contactless proximity target;
- a mechanical power service pathway interconnecting the mechanical power service source and the mechanical power connector component; and
- a service switch selectively permitting the communication of the mechanical power service along the mechanical power service pathway in response to detection of a contactless proximity target by the contactless proximity sensor;
- wherein the contactless proximity target comprises a magnet, the contactless proximity sensor comprises a magnet, and the service switch is powered at least partially by the magnetic interaction between the contactless proximity sensor and the contactless proximity target.

20. The system according to claim 19, wherein the mechanical power connector further comprises the mechanical power service source.

21. The system according to claim 19, wherein the service switch selectively forms the mechanical power service pathway in response to the detection of the contactless proximity target by the contactless proximity sensor.

22. The system according to claim 21, wherein the contactless proximity sensor is movable between a first position, in which the mechanical power service is substantially prevented from communicating through the mechanical power service pathway, and a second position, in which the mechanical power service is allowed to pass through the mechanical power service pathway.

23. The system according to claim 22, wherein the contactless proximity sensor is arranged in the first position when the contactless proximity sensor does not detect the contactless proximity target.

24. The system according to claim 22 and further comprising a biasing member connected to the contactless proximity sensor, the biasing member urging the contactless proximity sensor toward the first position.

25. The system according to claim 22, wherein the service switch comprises the contactless proximity sensor, the contactless proximity sensor responding to the detection of the contactless proximity target by moving away from the first position toward the second position.

26. The system according to claim 19 and further comprising a mechanical power service consumer coupled to the mechanical power service pathway.

27. The system according to claim 19 and further comprising a mechanical power service provider coupled to the mechanical power service pathway.

28. The system according to claim 19, wherein the mechanical power connector component comprises at least one of a flat clutch plate, a toothed clutch plate, a wheel, a gear and a keyed coupling component.

29. The system according to claim 19, wherein the service switch responds to movement of the contactless proximity sensor in response to the detection of the contactless proximity target by the contactless proximity sensor.

30. The system according to claim 19, wherein the contactless proximity sensor responds to detection of the contactless proximity target by sending a signal to the service switch.

31. The system according to claim 30, wherein the signal comprises at least one of an electrical signal, a change in voltage, a change in current, a change in frequency, a change in resistance, a change in reactance, a mechanical signal, a change in pressure, and a displacement vibration.

32. The system according to claim 19, wherein the host comprises at least one of a refrigerator, a freezer, a conventional oven, a microwave oven, a dishwashing machine, a stove, a range, an air conditioner, a dehumidifier, a clothes washing machine, a clothes dryer, a clothes refreshing machine, a non-aqueous washing apparatus, a water softener, a water heater, a furnace, pool water treatment equipment, an HVAC system, a thermostat, a blender, a mixer, a toaster, a coffee maker, an air purifier, an iron, a vacuum cleaner, a robot, a trash compactor and a structural feature of a building.

33. The system according to claim 19, wherein the contactless proximity sensor detects at least one of magnetism, an electromagnetic wave, an acoustic wave, a visual target and a chemical component.

34. The system according to claim 19, wherein the service switch is powered by a mechanical movement of the contactless proximity sensor in response to the magnetic interaction between the contactless proximity sensor and the contactless proximity target.

35. An accessory having a mechanical power service consumer for use in association with a host having a mechanical power service provider, a first mechanical power connector component, and a mechanical power service pathway selectively providing a mechanical power service to the first mechanical power connector in response to a contactless proximity sensor detecting a contactless proximity target, the accessory comprising:
- a second mechanical power connector component;
- a mechanical power service pathway for interconnecting the mechanical power service consumer and the second mechanical power connector component; and
- a contactless proximity target capable of activating the contactless proximity sensor to activate the mechanical power service pathway;
- wherein the contactless proximity target comprises a magnet.

36. The accessory according to claim 35 and further comprising a housing, wherein the mechanical power service consumer, the mechanical power service pathway, and the contactless proximity target are each at least partially disposed within the housing.

37. The accessory according to claim 35 and further comprising an adapter, the mechanical power service consumer further comprising an accessory device capable of being removably coupled to the adapter.

38. The accessory according to claim 35, wherein the contactless proximity target provides at least one of magnetism, an electromagnetic wave, an acoustic wave, a visual target, and a chemical component.

39. The accessory according to claim 35, wherein the contactless proximity target is selected from a passive target and an active target.

40. An adapter for removably coupling a portable device having a first device mechanical power connector component to a host having a mechanical power service provider, a first host mechanical power connector component, a first mechanical power service pathway selectively providing a mechanical power service to the first mechanical power connector, and a service switch selectively activated in response to a contactless proximity sensor detecting a contactless proximity target to permit the mechanical power service pathway to provide the mechanical power service the first mechanical power connector, the adapter comprising:

a second host mechanical power connector component engageable with the first host mechanical power connector component;

a second device mechanical power connector component engageable with the first device mechanical power connector component;

a second mechanical power service pathway interconnecting the second host mechanical power connector component and the second device mechanical power connector component for the transfer of a mechanical power service there along; and a contactless proximity target capable of activating the contactless proximity sensor to activate the service switch.

41. The adapter according to claim 40, wherein the contactless proximity target provides at least one of magnetism, an electromagnetic wave, an acoustic wave, a visual target, and a chemical component.

42. The adapter according to claim 40, wherein the contactless proximity target is selected from a passive target and an active target.

43. A second mechanical power service communicating device for mechanical power service communication with a first mechanical power service communicating device having a first mechanical power service connector component, and a first contactless proximity system component, the second mechanical power service communicating device comprising:

a second mechanical power connector component capable of coupling with the first mechanical power service connector component for communication of mechanical power service therebetween; and a second contactless proximity system component associated with the second mechanical power connector component and capable of engaging the first contactless proximity system component within a contactless proximity system to selectively regulate the communication of mechanical power service between the first and second mechanical power connector components in response to the interaction of the first and second contactless proximity system components;

wherein the second mechanical power service communicating device comprises a consumable holder.

44. The second mechanical power service communicating device according to claim 43 and further comprising an electro-magnetically operated service switch capable of communicating with at least one of the first and second contactless proximity system components and of controlling the communication of mechanical power service by the second mechanical power connector component, in response to the interaction between the first and second proximity system components.

45. The second mechanical power service communicating device according to claim 43, wherein the second mechanical power service communicating device comprises an appliance.

46. The second mechanical power service communicating device according to claim 43, wherein the second mechanical power service communicating device comprises an appliance accessory.

47. The second mechanical power service communicating device according to claim 43, wherein the second mechanical power service communicating device comprises a mechanical power service consumer.

\* \* \* \* \*